United States Patent
Reddy et al.

(10) Patent No.: US 10,462,616 B2
(45) Date of Patent: Oct. 29, 2019

(54) SMS/MMS MESSAGE SYNCHRONIZATION

(71) Applicant: T-Mobile USA, Inc., Bellevue, WA (US)

(72) Inventors: Ravikiran Reddy, Bellevue, WA (US); Venkata Kondeti, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/395,881

(22) Filed: Dec. 30, 2016

(65) Prior Publication Data

US 2018/0192262 A1 Jul. 5, 2018

(51) Int. Cl.
*H04W 4/00* (2018.01)
*H04W 4/14* (2009.01)
*H04W 56/00* (2009.01)
*H04L 29/08* (2006.01)

(52) U.S. Cl.
CPC ............. *H04W 4/14* (2013.01); *H04L 67/04* (2013.01); *H04L 67/125* (2013.01); *H04L 67/26* (2013.01); *H04W 56/0005* (2013.01)

(58) Field of Classification Search
CPC ........................... H04M 1/72552; H04W 4/12
See application file for complete search history.

(56) References Cited

U.S. PATENT DOCUMENTS

| | | | |
|---|---|---|---|
| 2008/0167066 A1* | 7/2008 | Yoon | H04M 1/274516 455/550.1 |
| 2009/0203402 A1* | 8/2009 | Aftab | G06Q 10/10 455/557 |
| 2015/0163647 A1* | 6/2015 | Lynn | H04W 4/14 455/466 |
| 2015/0281921 A1* | 10/2015 | Bakker Lee | H04M 3/533 455/413 |

* cited by examiner

*Primary Examiner* — Shantell L Heiber
(74) *Attorney, Agent, or Firm* — Lee & Hayes, P.C.

(57) ABSTRACT

A cellular communication carrier may implement SMS/MMS services using both a traditional store-and-forward system and an enhanced messaging system having a common, service-maintained message store for access by multiple clients. In order to enhance interoperability between the systems, a synchronization client is installed on a mobile device having a traditional SMS/MMS messaging client. The synchronization client accesses the local message store of the mobile device and also communications with the enhanced messaging system in order to synchronize the local message store and the common message store of the enhanced messaging system.

20 Claims, 3 Drawing Sheets

SMS/MMS MESSAGE SYNCHRONIZATION

BACKGROUND

People often have multiple telecommunication devices such as cellular phones, tablet computers, laptops, and other devices. Each device may have its own communication address, such as an email address or telephone number. When calling or sending a message to a desired recipient, the email address or telephone number may be used to specify the recipient.

In the case of email, a person may have several devices configured to send and receive messages using a particular account and a corresponding email address. In the case of traditional carrier-supported messaging services such as SMS (short message service) or MMS (multimedia message service), however, message recipients are usually designated by telephone numbers, each of which is associated with only a single device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
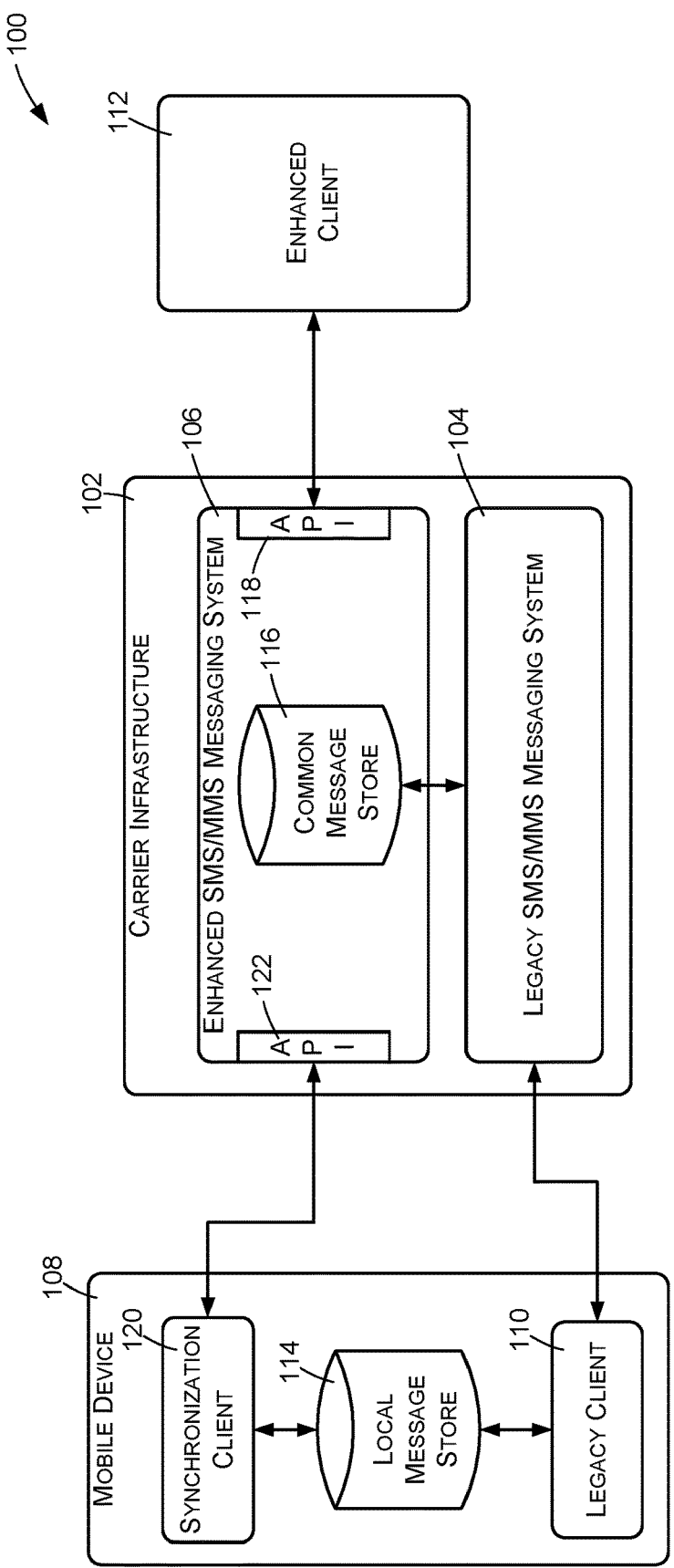
FIG. 1 is a block diagram of a messaging environment that includes both a legacy SMS/MMS system and an enhanced SMS/MMS system.

Described herein are systems and methods that may be used for interoperability between traditional store-and-forward messaging systems and newer messaging systems having central message stores that can be accessed by multiple messaging clients. The described techniques can be used with carrier-supported messaging platforms such as SMS/MMS (short message system/multimedia message system) systems, which are supported across most cellular communication carriers.

Traditional SMS/MMS platforms use a telephone number as a destination address for messages. Each telephone is uniquely associated with a mobile communication device. When a message is addressed to a particular telephone number, the message is delivered to the mobile communication device associated with the telephone number. A message service center, which is responsible for delivery of messages, temporarily stores each message until it can be delivered. This type of delivery is known as "store-and-forward." Once a message has been delivered, it is no longer stored by the messaging service center. Rather, both outgoing and incoming messages are stored in a message store that is local to the mobile device.

An enhanced messaging service may be designed for compatibility with traditional SMS/MMS systems, but may allow more than one device to receive messages addressed to single telephone number. In some cases, such an enhanced messaging service may allow a person to use messaging services apart from a telephone. For example, a person may log onto a website to access their messages, and may additionally compose and send messages using such a website. Furthermore, it may be possible to use OTT (over-the-top) applications that are installed on mobile devices and that do not rely on the access network of the cellular infrastructure for sending and receiving SMS/MMS messages. For example, such OTT applications may communicate using Wi-Fi access to the Internet and/or using Internet access provided over the top of cellular communications.

Generally, messaging platforms are accessed using one or more messaging clients. For SMS/MMS messages, clients have typically comprised individual mobile devices having native messaging functionalities that rely on the access networks of cellular communication carriers. Using newer technologies, however, a messaging client may be an OTT application that communicates over the Internet, at a level above the cellular access networks. An Internet browser may also be used as a client of a website from which messages can be viewed and sent. In this case, the website itself may also be considered to be a client. As used herein, the term "client" is used to indicate any hardware or software component that is responsible for displaying or otherwise presenting messages to a user and/or for interacting with a user to send messages.

In order to allow the use of multiple messaging clients to access messages of a single account or user, an enhanced messaging service may maintain a common, persistent message store. This central, server-maintained message store may be used to persistently store all outgoing and incoming messages for a particular telephone number or other communication address. Multiple messaging clients may be used to access the common message store. Regardless of the client, a user is able to access all messages that have been sent and received by that user. Furthermore, the clients do not need to maintain local message stores because the current state of the user's messages is always available from the server-maintained message store.

For purposes of discussion, traditional messaging systems that use store-and-forward delivery as described above will be referred to as legacy systems. Clients designed for compatibility with the legacy systems will be referred to as legacy clients. In a legacy system, sent and received messages are stored in local message stores of a client device for future access rather than being available from a central or server-based message store.

Messaging systems that use a persistent, server-maintained, common message store will be referred to for purposes of discussion as enhanced messaging systems. Clients designed for compatibility with enhanced systems will be referred to as enhanced clients. In an enhanced system, sent and received messages of a user are stored in the common message store where they are available to multiple clients of the user. Although enhanced clients may at times cache messages locally, all non-deleted outgoing and incoming messages are available to any enhanced client through the common, server-maintained message store.

In some usage scenarios, a user who is a subscriber of a particular cellular communications carrier may have one device that uses a legacy SMS/MMS client and may also use one or more enhanced SMS/MMS messaging clients. For this reason, the carrier may want to maintain both types of systems in parallel. In this situation, the legacy SMS/MMS system is configured to provide copies of incoming and outgoing message to the enhanced SMS/MMS messaging system. The enhanced system stores the copies in the common message store so that enhanced clients have access to all messages, including messages that have been sent or received using the legacy messaging system.

However, there may arise certain situations in which the common message store of the enhanced messaging system does not contain all of a user's messages. For example, consider a user who has used the traditional SMS/MMS system and now upgrades to also use the enhanced SMS/MMS system. In this situation, the user's device may have sent and received many messages, which are stored locally on the user's device, but which are not present in the common message store of the enhanced messaging system. When logging on to an enhanced client to view their messages, the user will be disappointed to find that none of their previously sent or received messages are available.

As another example, a user of the enhanced messaging system may purchase a new mobile device that is configured with a legacy client to use the legacy SMS/MMS messaging system. In this case, the legacy client will not have access to the common message store, and the user will be unable to view older messages on their phone. Note that this situation may also arise in the case of newer messages that are generated using the enhanced system.

In the described embodiments, an application referred to as a synchronization client is provided for installation on a mobile device that has otherwise been configured to use the legacy SMS/MMS messaging services of a cellular communications provider. The synchronization client has access to the local message store of the mobile device and is also able to communicate with the enhanced SMS/MMS messaging system. The synchronization client may be executed to synchronize the local message store of the mobile device with the common message store maintained by the enhanced messaging service.

In some embodiments, the synchronization client may be designed to run a single time when setting up the mobile device in order to copy all messages in the common message store of the enhanced messaging system to the local message store of the mobile device. In some cases, the synchronization client may be configured to copy any existing messages in the local messages store to the server-maintained common message store of the enhanced messaging system.

In certain embodiments, the synchronization client may be designed to run continuously or periodically, to continuously or repeatedly synchronize the local message store of the mobile device with the common message store of the enhanced messaging service. The synchronization client may run in the background, for example, without user interaction or intervention.

In certain embodiments, the synchronization client may be responsive to push notifications received from the enhanced messaging system. For example, the enhanced messaging system may send a push notification when a new message is stored in the common message store of the enhanced messaging system. The synchronization client may be responsive to such a push notification to perform a synchronization with the enhanced messaging system so that the new message is obtained and stored in the local message store of the mobile device. In some cases, a push notification regarding a new message may include the new message, so that the synchronization client can store the message in the local message store upon receipt of the push notification, without further communications.

FIG. 1 shows an example of an environment or system 100 in which the described techniques may be implemented. FIG. 1 shows a carrier infrastructure 102 that implements a legacy SMS or SMS/MMS messaging system 104. The legacy messaging system may provide text messaging services as well as services for messaging other types of media. The carrier infrastructure 102 also implements an enhanced SMS or SMS/MMS messaging system 106, which may provide text messaging services as well as services for messaging other types of media.

FIG. 1 also illustrates a mobile device 108 as an example of a wireless telecommunication device that implements a legacy text message client 110, which may comprise a legacy SMS or SMS/MMS client. FIG. 1 also illustrates an enhanced text message client 112, which may comprise an SMS or SMS/MMS client that is compatible with the enhanced SMS/MMS messaging system 106. Note that although the messaging components may be described in the context of SMS text messaging, it is to be understood that the messaging components may also facilitate MMS multimedia messaging that may include pictures, video, audio, etc.

The legacy SMS/MMS messaging system 104 may comprise a message server or message service center that implements traditional store-and-forward SMS/MMS message communications as described above. Communications between the legacy messaging system 104 and the legacy client 110 are performed through the cellular access network of the carrier infrastructure 102. When the legacy messaging system 104 receives a message, such as a text message, that is addressed to a telephone number associated with the mobile device 108, the message is temporarily stored by the legacy messaging system 104 until it can be delivered to the legacy client 110 of the mobile device 108. The message is not stored by the legacy messaging system 104 after delivery. Rather, the legacy client 110 stores both sent and received messages in a local message store 114, which is implemented within non-volatile memory of the mobile device 108.

The mobile device 108 may comprise any cellular communication device having a legacy client 110. For example, the mobile device 108 may comprise a wireless telephone, a smartphone, a tablet computer, a wearable device, etc. In a device such as this having native cellular communications capabilities, the legacy client 110 is typically part of the device 108 as it is sold to customers, and may therefore be referred to as a native client.

The enhanced SMS/MMS messaging system 106 may be an SMS/MMS platform that allows a user to access their SMS/MMS messages using multiple enhanced clients 112. As described above, the enhanced messaging system 106 has or has access to a common, persistent message store 116. For a given user, all messages that have not been deleted by the user are stored in the common message store, including all outgoing messages and all incoming messages. As also described above, the enhanced client 112 may comprise an application installed on any type of device, including mobile devices and other devices such as desktop computers. Such an application may be installed on a device by a user of the device or may be pre-installed prior to the user purchasing the device. The enhanced client 112 may also comprise an Internet browser that runs on any sort of device and that accesses a website for reading and sending SMS/MMS messages. The enhanced client 112 in some cases may comprise such a website that is used for reading and sending SMS/MMS messages. Although only a single enhanced client is shown, multiple enhanced clients may be used by a given user to read, send, and receive messages using the enhanced messaging system 106.

In operation, the enhanced SMS/MMS messaging system has APIs (application programming interfaces) 118 that are accessible to the enhanced client 112 through a public network such as the Internet. The enhanced client 112 communicates through the APIs 118 to access the messages in the common message store 116, as well as to send new messages using the enhanced messaging system 106. In some embodiments, the enhanced messaging system 106 may send push notifications to the enhanced client 112 to alert the enhanced client 112 to the arrival of new messages in the common message store 116. In response, the enhanced client may communicate further with the enhanced messaging system to display the new messages. Some enhanced clients may be configured to locally cache outgoing and incoming messages in response to push notifications. Other enhanced clients may be configured to rely on the storage of the messages by the enhanced messaging system, and to retrieve messages from the common message store 116 when needed for display.

In the described embodiment, the legacy messaging system 104 is configured for certain communications with the enhanced messaging system 106. In particular, the legacy messaging system 104 is configured to provide a copy of all messages that it processes for a user to the enhanced messaging system 106, to be stored in the common message store 116. That is, when an outgoing message is received by the legacy messaging system 104 from the legacy client 110, a copy of the outgoing message is provided to the enhanced messaging system 106, to be stored in the common message store 116. When an incoming message is received by the legacy messaging system 104 for delivery to the legacy client 110, a copy of the incoming message is also provided to the enhanced messaging system 106, to be stored in the common message store 116. The enhanced client 112 therefore has access to messages that are processed by the legacy messaging system 104. As noted above, however, this may not be the case for messages processed by the legacy messaging system 104 prior to the time that the user started using the enhanced messaging system 106.

In addition to the legacy components described thus far, the mobile device 108 has a synchronization client 120, which is an application running on the mobile device 108 that synchronizes messages between the local message store 114 of the mobile device 108 and the common message store 116 of the enhanced messaging system 106.

The synchronization client 120 may be an application that is installed by the user of the mobile device 108 at any time after obtaining the mobile device 108, such as after purchasing the mobile device. For example, the synchronization client 120 may be downloaded from an online application store or market. Alternatively, the synchronization client 120 may be pre-installed by a manufacturer, distributor, or other seller of the mobile device 108 before sale of the device to the user. The synchronization client 120 may communicate with the enhanced messaging system 106 using OTT communications, without relying on cellular access networks. For example, the synchronization client 120 may be configured to communicate over the Internet, using Wi-Fi or using IP (Internet Protocol) communications over the top of cellular protocols.

The synchronization client 120 may perform various functions and may interact in various ways with the enhanced messaging system 106 using an API 122 that is exposed by the enhanced messaging system 106. The API 122 may allow the synchronization client 120 to retrieve messages from the common message store 116 and to write messages to the common message store 116. The API 122 may vary in sophistication, depending on implementation. In addition to providing basic read/write functionality with respect to the common message store 116, the API 122 may support various types of message synchronization functionality, and may in some cases provide push notifications to the synchronization client 120 when new messages are stored in the common message store 116.

The synchronization client 120 is also capable retrieving messages from the local message store and of writing messages to the local message store. In some cases, the synchronization client 120 may have access to the local message store 114 through APIs exposed by the operating system of the mobile device 108 and/or by other software elements of the mobile device 108.

The synchronization client 120 is configured to synchronize the messages stored in the local message store 114 with the messages stored in the common message store 116. Synchronizing the local message store 114 with the common message store 116 may include ensuring that all messages in the local message store 114 are in the common message store 116. For example, synchronization may involve identifying any messages in the local message store 114 that are not in the common message store 116, and copying the identified messages to the common message store 116.

Alternatively, or in addition, synchronizing the local message store 114 with the common message store 116 may include ensuring that all messages in the common message store 116 are in the local message store 114. For example, synchronization may involve identifying any messages in the common message store 116 that are not in the local message store 114, and copying the identified messages to the local message store 114.

The synchronization client 120 may be configured in various ways to perform various types of synchronization. As one example, the synchronization client 120 may be configured to run a single time, upon initial setup and configuration of the mobile device 108, to copy all messages from the common message store 116 to the local message store 114. Alternatively, the synchronization client 120 may be initiated after a user enables the enhanced messaging system 106, to copy all messages from the local message store 114 of a previously used mobile device 108 to the common message store 116.

As another example, the synchronization client 120 may be configured to run periodically or continuously, to repeatedly or continuously perform either a one-way or two-way synchronization between the local message store 114 and the common message store 116. One-way synchronization comprises ensuring that all messages in the local message store 114 are also in the common message store 116, or that all messages in the common message store 116 are also in the local message store 114. Two-way synchronization comprises ensuring that all messages in the local message store 114 are also in the common message store 116, and that all messages in the common message store 116 are also in the local message store 114.

In some implementations, the synchronization client 120 may be configured to receive push notifications from the enhanced messaging system 106, indicating that one or more new messages have been stored in the common message store 116. Notifications may also indicate deletions of one or more messages from the common message store 116. The notifications may be general or specific. A general notification may indicate only that a change has occurred in the common message store, and the synchronization client 120 may respond by performing a general one-way or two-way synchronization. A specific notification may indicate the addition of an identified message, and the synchronization client 120 may respond by retrieving the identified message from the common message store 116. In some cases, a specific notification may include the message itself, eliminating the need for the synchronization client 120 to perform further communications in order to obtain the message.

Figure 2:
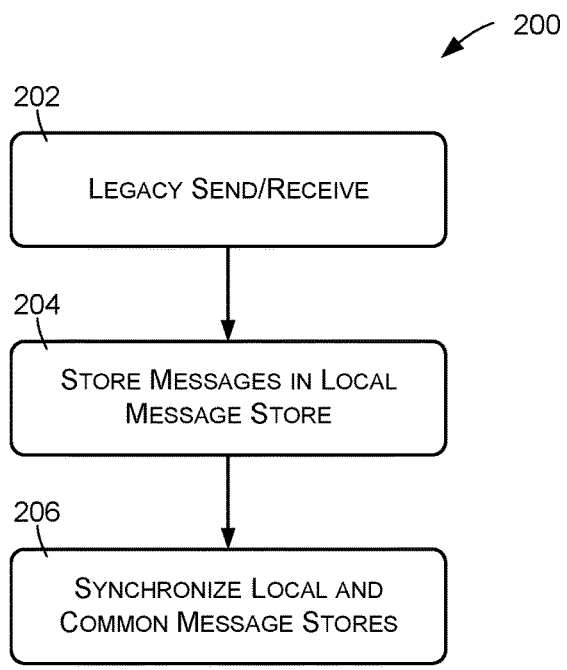
FIG. 2 is a flow diagram illustrating an example method of synchronizing between the legacy SMS/MMS system and the enhanced SMS/MMS system.

FIG. 2 shows an example method 200 that may be performed by a mobile communication device, such as cellular telephone or other cellular communication device, to allow a legacy messaging client to be used with an enhanced messaging system. The method 200 will be describe in the context of FIG. 1, although the method 200 may also be used in different environments.

An action 202 comprises communicating with a first message service of a cellular communication carrier to send outgoing text messages and to receive incoming text messages. The action 202 may be performed, for example, by the legacy client 110 described above, which may be provided natively by the mobile device 108. The first message service, referred to as the legacy messaging system 104 in the description above, is of a first kind or type that temporarily stores the outgoing and incoming text messages until they are delivered. The messages typically are not stored persistently by the first message service after they are delivered to their recipients.

An action 204, which may also be performed by the legacy client 110, comprises persistently storing the outgoing text messages and the incoming text messages in a message store that is local to the mobile device, such as in the local message store 114 described above.

An action 206 may be performed by a companion or add-in application, referred to as the synchronization client 120 in the description above, which may or may not be provided natively by the mobile device 108. The action 206 comprises communicating with a second message service of the cellular communication carrier to synchronize messages that are in a common message store of the second message service with messages that are in the local message store. The second message service, referred to as the enhanced messaging system 106 in the description above, is of a second kind or type that persistently stores text messages in the common message store for access by multiple text message clients.

The action 206 may be performed one time in order to provide an initial synchronization between the local messages store and the common message store. For example, the action 206 may be performed when setting up a new mobile device or when enabling enhanced messaging services.

In one embodiment, the action 206 may comprise copying all messages that are in the common message store 116 to the local message store 114. In another embodiment, the action 206 may comprise copying all messages that are in the local message store 114 to the common message store 116.

In another embodiment, the action 206 may comprise identifying a first set of one or more messages that are (a) in the common message store 116 and (b) absent from the local message store 114, and copying the first set of one or more messages from the common message store 116 to the local message store 114. The action 206 may also, or alternatively, comprise identifying a second set of one or more messages that are (a) in the local message store 114 and (b) absent from the common message store 116, and copying the second set of one or more text messages from the local message store 114 to the common message store 116.

In some embodiments, the action 206 may be performed repeatedly, to ensure that all messages of the local store are also in the common message store and/or to ensure that all messages of the common message store are also in the local message store.

In some embodiments, the action 206 may be performed in response to receiving a push notification from the enhanced messaging service. Such a push notification may be sent by the enhanced message system 106 whenever one or more messages have been added to or deleted from the common message store 116. In some cases, the push notification may identify a particular message that has been added or deleted. If a message has been added, the action 206 may comprise retrieving the identified message from the common message store 116 and storing the identified message in the local message store 114. If a message has been deleted, the action 206 may comprise deleting the identified message from the local message store 114. In some cases, a push notification may indicate merely that an unspecified addition or deletion has taken place in the common message store 116, and the action 206 may comprise examining the messages of the local message store 114 and the common message store 116 to identify any discrepancies, and copying messages as necessary to resolve the discrepancies.

In some embodiments, the action 206 may comprise monitoring the local message store 114 to determine when a message has been deleted from the local message store 114 by the legacy client 110, and in response instructing the enhanced messaging system 106 to delete the message from the common message store 116. In some embodiments, the action 206 may comprise monitoring the local message store 114 to determine when a message has been added to the local message store 114 by the legacy client 110, and in response instructing the enhanced messaging system 106 to add the message to the common message store 116.

Figure 3:
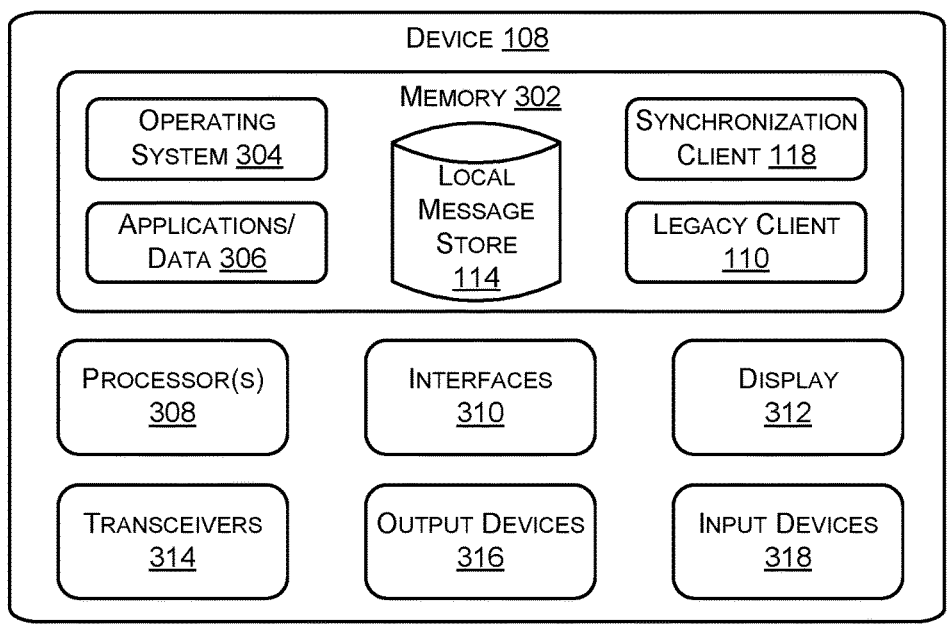
FIG. 3 is a block diagram of an example mobile telecommunications device that may be used in conjunction with the techniques described herein.

FIG. 3 illustrates an example implementation of the mobile device 108 in accordance with various embodiments. The device 108 may include memory 302, which may store an operating system 304 as well as various applications and data 306. The device memory 302 may also be used for storage of the local message store 114, the legacy client 110, and the synchronization client 120. The device 108 also has one or more processors 308 for executing the operating system and the various applications. Each processor may comprise a central processing unit (CPU), a graphics processing unit (GPU), or other processing unit or component known in the art.

Generally the memory 302 stores one or more sets of instructions (e.g., software) such as a computer-executable program that embodies operating logic for implementing and/or performing any one or more of the methodologies or functions described herein as being performed by the mobile device 108. Supporting or associated data is also stored by the memory 302. The instructions and/or data may reside, completely or at least partially, within the memory 302 and within the processor 308 during execution thereof by the device 108.

In various embodiments, the memory 302 may include both volatile memory and non-volatile memory. The memory 302 can also be described as non-transitory computer storage media/memory, machine-readable media/memory, or computer-readable media/memory, and may include removable and non-removable media implemented in any method or technology for storage of information, such as computer readable instructions, data structures, program modules, or other data.

Non-transitory computer-readable media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the device 108. Any such non-transitory computer-readable media may be part of the device 108.

The device 108 may have interfaces 310 such as are known in the art. The interfaces 310 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

In various embodiments, the device 108 may have a display 312 such as a liquid crystal display or any other type of display commonly used in telecommunication devices or other portable devices. For example, the display 312 may be a touch-sensitive display screen, which may also act as an input device or keypad, such as for providing a soft-key keyboard, navigation buttons, or the like.

The mobile device 108 may also include one or more transceivers 314, which may include any sort of transceivers known in the art. For example, the transceivers 314 may include radio radios and/or radio transceivers and interfaces that perform the function of transmitting and receiving radio frequency communications via an antenna, through a cellular communication network of a cellular communications carrier. The radio interfaces facilitate wireless connectivity between the device 108 and various cell towers, base stations and/or access points.

The mobile device 108 may have output devices 316, which may include any sort of output devices known in the art, such as a display (already described as display 312), speakers, a vibrating mechanism, or a tactile feedback mechanism. The output devices 316 also include ports for one or more peripheral devices, such as headphones, peripheral speakers, or a peripheral display.

The mobile device 108 may have input devices 318, which may include any sort of input devices known in the art. For example, the input devices 318 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Figure 4:
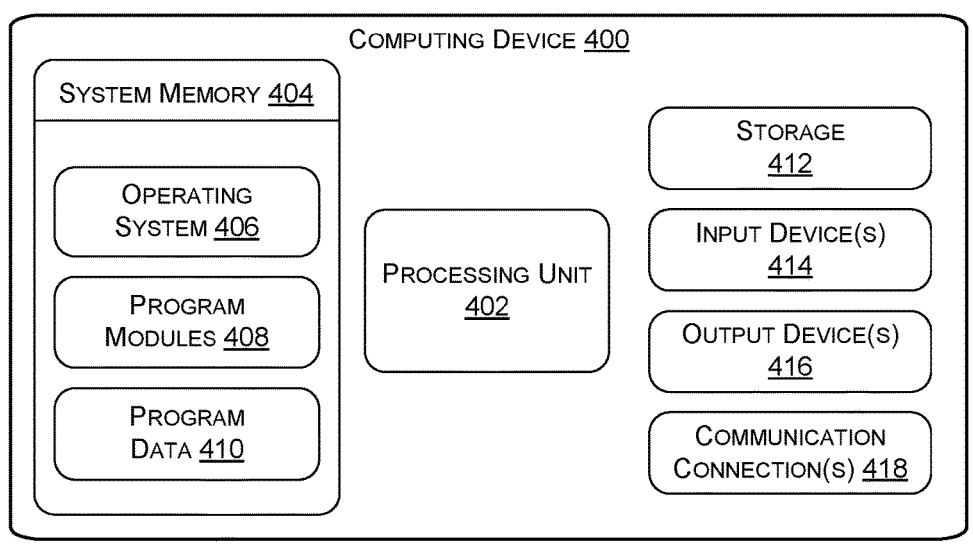
FIG. 4 is a block diagram of an example computing device that may be configured to implement various functionality of a carrier infrastructure such as a legacy SMS/MMS messaging system and an enhanced SMS/MMS messaging system.

FIG. 4 is a block diagram of an illustrative computing device 400 such as may be used to implement various components discussed above, such as elements of the carrier infrastructure 102. For example, one or more computing devices 800 may be configured or programmed to implement all or part of any one of the legacy messaging system 104 or the enhanced messaging system 106, as well as other components that are not specifically shown or discussed.

In various embodiments, the computing device 400 may include at least one processing unit 402 and system memory 404. Depending on the exact configuration and type of computing device, the system memory 404 may be volatile (such as RAM), non-volatile (such as ROM, flash memory, etc.) or some combination of the two. The system memory 404 may include an operating system 406, one or more program modules 408, and may include program data 410.

The computing device 400 may also include additional data storage devices (removable and/or non-removable) such as, for example, magnetic disks, optical disks, or tape. Such additional storage is illustrated in FIG. 4 by storage 412.

Non-transitory computer storage media of the computing device 400 may include volatile and nonvolatile, removable and non-removable media implemented in any method or technology for storage of information, such as computer readable instructions, data structures, program modules, or other data. The system memory 404 and storage 412 are all examples of computer-readable storage media. Non-transitory computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such non-transitory computer-readable storage media may be part of the computing device 400.

In various embodiment, any or all of the system memory 404 and storage 412 may store programming instructions which, when executed, implement some or all of the function functionality described above as being implemented by components of the legacy messaging system 104 or the enhanced messaging system 106.

The computing device 400 may also have input device(s) 414 such as a keyboard, a mouse, a touch-sensitive display, voice input device, etc. Output device(s) 416 such as a display, speakers, a printer, etc. may also be included. The computing device 400 may also contain communication connections 418 that allow the device to communicate with other computing devices.

Although features and/or methodological acts are described above, it is to be understood that the appended claims are not necessarily limited to those features or acts. Rather, the features and acts described above are disclosed as example forms of implementing the claims.

What is claimed is:

1. A wireless telecommunication device comprising:
   a text message client for a user to send outgoing text messages and to receive incoming text messages through a first text message service of a cellular communication carrier, the first text message service comprising a short message service (SMS) that temporarily stores the outgoing text messages and the incoming text messages until they are delivered;
   a non-transitory computer-readable storage medium;
   a local message store in the non-transitory computer-readable storage medium, the text message client being configured to persistently store the outgoing text messages and the incoming text messages in the local message store for viewing by the user;
   a synchronization client that communicates with a second text message service of the cellular communication carrier, the second text message service having a common message store that persistently stores text messages for access by multiple text message clients of the user;

the synchronization client being configured to synchronize messages that are in the common message store with messages that are in the local message store at least in response to receiving, from the second text message service, a push notification indicating that one or more new messages have been stored at the common message store, the push notification including the one or more new messages.

2. The wireless telecommunication device of claim 1, wherein the synchronization client comprises an executable application installed by the user.

3. The wireless telecommunication device of claim 1, wherein the synchronization client comprises an executable application installed before sale of the wireless telecommunication device to the user.

4. The wireless telecommunication device of claim 1, wherein the synchronization client is configured to:
  monitor the local message store;
  determine that a text message has been deleted from the local message store; and
  instruct the second text message service to delete the text message from the common message store.

5. The wireless telecommunication device of claim 1, wherein the synchronization client is configured to synchronize the messages by:
  identifying a first set of one or more messages that are (a) in the common message store and (b) absent from the local message store; and
  copying the first set of one or more messages from the common message store to the local message store.

6. The wireless telecommunication device of claim 1, wherein the synchronization client is configured to synchronize the messages by:
  identifying a first set of one or more messages that are (a) in the common message store and (b) absent from the local message store;
  copying the first set of one or more messages from the common message store to the local message store;
  identifying a second set of one or more messages that are (a) in the local message store and (b) absent from the common message store; and
  copying the second set of one or more messages from the local message store to the common message store.

7. The wireless telecommunication device of claim 1, wherein the synchronization client is configured to synchronize messages at least in response to the push notification indicating that one or more new messages have been stored at the common message store.

8. The wireless telecommunication device of claim 1, wherein the synchronization client communicates with an application programming interface (API) of the second text message service of the cellular communication carrier.

9. One or more non-transitory computer-readable media storing an application that is configured for execution by one or more processors of a mobile device to perform actions comprising:
  communicating with a first message service of a cellular communication carrier to send outgoing messages and to receive incoming messages, the first message service being of a first kind that temporarily stores the outgoing messages and the incoming messages until they are delivered;
  persistently storing the outgoing messages and the incoming messages in a local message store that is local to the mobile device; and
  communicating with a second message service of the cellular communication carrier, via an application programming interface (API) of the second message service of the cellular communication carrier, to synchronize messages that are in a common message store of the second message service with messages that are in the local message store, the second message service being of a second kind that persistently stores messages in the common message store for access by multiple message clients;
  the communicating with the second message service of the cellular communication carrier to synchronize messages comprising:
    identifying a first set of one or more messages that are (a) in the common message store and (b) absent from the local message store; and
    copying, in response to identifying the first set of one or more messages, the first set of one or more messages from the common message store to the local message store.

10. The one or more non-transitory computer-readable media of claim 9, wherein communicating with the second message service of the cellular communication carrier to synchronize messages comprises being performed repeatedly.

11. The one or more non-transitory computer-readable media of claim 9, wherein the application is configured to be executed one time to synchronize messages that are in the common message store of the second message service with messages that are in the local message store.

12. The one or more non-transitory computer-readable media of claim 9, the actions further comprising synchronizing the messages in response to receiving a push notification from the second message service.

13. The one or more non-transitory computer-readable media of claim 12, wherein the push notification includes identification information of at least one message stored in the common message store.

14. The one or more non-transitory computer-readable media of claim 9, the actions further comprising:
  monitoring the local message store;
  determining that a message has been deleted from the local message store; and
  instructing the second message service to delete the message from the common message store.

15. The one or more non-transitory computer-readable media of claim 9, wherein communicating with a second message service of the cellular communication carrier to synchronize messages comprises:
  identifying a second set of one or more messages that are (a) in the local message store and (b) absent from the common message store; and
  copying the second set of one or more messages from the local message store to the common message store.

16. A method comprising:
  communicating from a communication device with a first message service of a cellular communication carrier to send outgoing messages and to receive incoming messages, the first message service being of a first kind that temporarily stores the outgoing messages and the incoming messages until they are delivered;
  persistently storing the outgoing messages and the incoming messages in a local message store that is local to the communication device; and communicating from the communication device with a second message service of the cellular communication carrier, via an application programming interface (API) of the second message service of the cellular communication carrier, to synchronize messages that are in a common message store of the second message service with messages that are in the local message store of the communication device, the second message service being of a second kind that persistently stores messages in the common message store for access by multiple message clients;

the communicating with the second message service of the cellular communication carrier to synchronize messages comprising:

identifying, by the communication device, a first set of one or more messages that are (a) in the local message store and (b) absent from the common message store; and copying, by the communication device and in response to identifying the first set of one or more messages, the first set of one or more messages from the local message store to the common message store.

17. The method of claim 16, wherein communicating with the second message service of the cellular communication carrier to synchronize messages comprises is performed repeatedly.

18. The method of claim 16, further comprising synchronizing the messages in response to receiving a push notification from the second message service.

19. The method of claim 16, further comprising:
monitoring the local message store;
determining that a message has been deleted from the local message store; and
instructing the second message service to delete the message from the common message store.

20. The method of claim 16, wherein communicating with the second message service of the cellular communication carrier to synchronize messages comprises:

identifying a second set of one or more messages that are (a) in the common message store and (b) absent from the local message store;

copying the second set of one or more messages from the common message store to the local message store.

* * * * *